INVENTOR.
ALAN G. GRACE
BY
FOWLER, KNOBBE
& GAMBRELL
ATTORNEYS.

INVENTOR.
ALAN G. GRACE
BY
FOWLER, KNOBBE
& GAMBRELL
ATTORNEYS.

INVENTOR
ALAN G. GRACE
BY
FOWLER, KNOBBE & GAMBRELL
ATTORNEYS.

LOW PASS FILTER

INVENTOR.
ALAN G. GRACE
BY
FOWLER, KNOBBE
& GAMBRELL
ATTORNEYS.

3,435,354

PULSE TYPE DEMODULATOR SYSTEM FOR ANGLE MODULATED SIGNALS UTILIZING THE CHARACTERISTICS OF A TUNNEL DIODE FOR FORMING THE PULSE TRAIN

Alan G. Grace, San Carlos, Calif., assignor, by mesne assignments, to Allan R. Fowler, Orange, Calif., trustee Filed Mar. 24, 1966, Ser. No. 537,223
Int. Cl. H03d *3/04, 1/10*
U.S. Cl. 329—126 7 Claims

ABSTRACT OF THE DISCLOSURE

A demodulator for angle modulated signals in which a first tunnel diode is triggered to apply a pulse input to a shorted delay line and a second tunnel diode is triggered to one state by the incident pulse and to its opposite state by the reflected pulse from the delay line for producing a train of pulses occurring at a rate which varies in accordance with the instantaneous frequency rate of the input frequency modulated waveform. This train of pulses is filtered for removing the carrier energy from the demodulated output.

The present invention relates to an improved demodulator for angle modulated signals and, particularly, to a demodulator having excellent linearity over the wide dynamic range of a magnetically recorded video signal.

One of the most difficult demodulation problems is involved in reproducing a recorded video signal. A television signal uses a wide spectrum of frequencies—a 3.65 megacycle range for monochrome and 4.25 megacycle range for color being representative. The frequency demodulation techniques used in reproducing the recorded waveform involve even higher instantaneous frequencies so that very short periods measured in tens of nanoseconds ($10^{-9}$ seconds) are typically involved in the demodulation process.

State of the art demodulation systems are plagued by several problems including frequency distortion, phase distortion and insufficient linearity, when used with signals having a wide frequency spectrum. In attempting to meet these problems, the design approaches used heretofore have necessitated that a substantial number of control or adjustment points be provided throughout the system. Examples of such include the plural controls needed to maintain a balanced duty cycle, the controls necessary to maintain balanced voltage sources, the controls necessary to maintain balanced current sources, and the controls necessary to maintain balanced amplifier gains. Even with all of these adjustments—with the attendant trouble and expense in maintaining them in the field—the prior art systems have failed to overcome all of these problems when used in conjunction with the frequency modulated output from a video tape recorder.

The present invention obviates these problems and does so, moreover, while requiring few, if any, controls. Briefly, in accordance with the preferred embodiment of the present invention, the demodulator includes a limiter providing a square wave output corresponding to the instantaneous frequency of the F.M. waveform, a stage responsive to this square wave output for providing a train of differentiated pulses at twice the instantaneous frequency rate, a first tunnel diode which is triggered by each of the differentiated pulses to apply a pulse input to a shorted delay line, and a second tunnel diode which is triggered to one state by the incident pulse and to its opposite state by the reflected pulse from said delay line. In this manner, a train of pulses is generated wherein the width of each pulse corresponds to twice the time delay of the delay line. As described below, the area of these pulses remains very constant, i.e., the amplitude, leading edge and trailing edge are quite independent of the frequency and amplitude of the input signal over a very wide range of frequencies. Further, these pulses are maintained in extremely close phase relationship to the zero crossover points of the F.M. signal so that this pulse train, when filtered, provides an accurate reproduction of an original modulation signal composed of a broad frequency spectrum. Moreover, this desirable result is achieved without the plurality of controls and adjustments employed in the prior art demodulators.

Other and further features and advantages of the invention will become apparent by a study of the following detailed description taken in connection with the accompanying drawings in which:

FIGS. 1*a* through 1*e* illustrate the general demodulation technique involved in the present invention;

Figure 2:
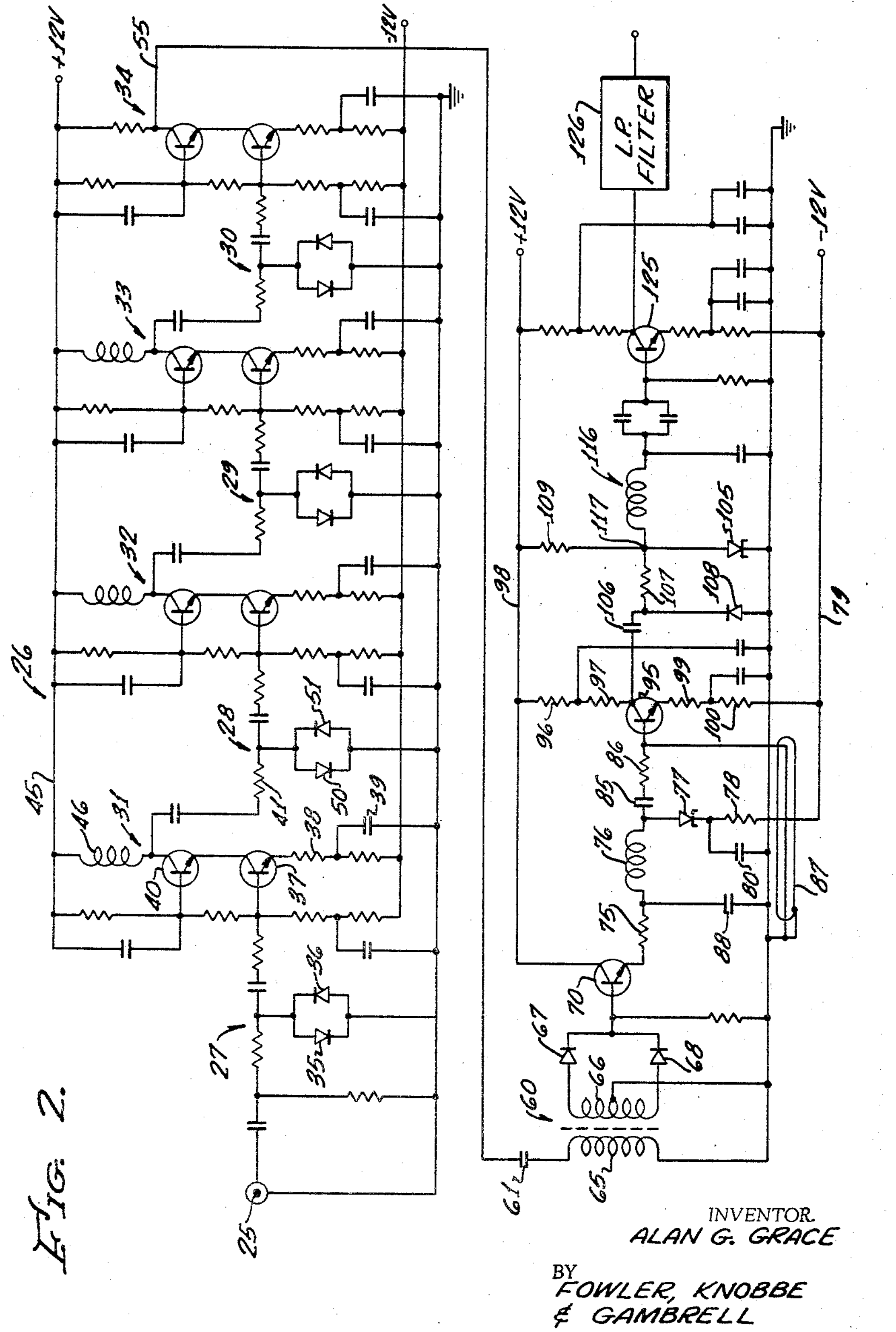
FIG. 2 is a schematic circuit of one embodiment of a demodulator constructed in accordance with the invention.
Figures 3, 4, 7:
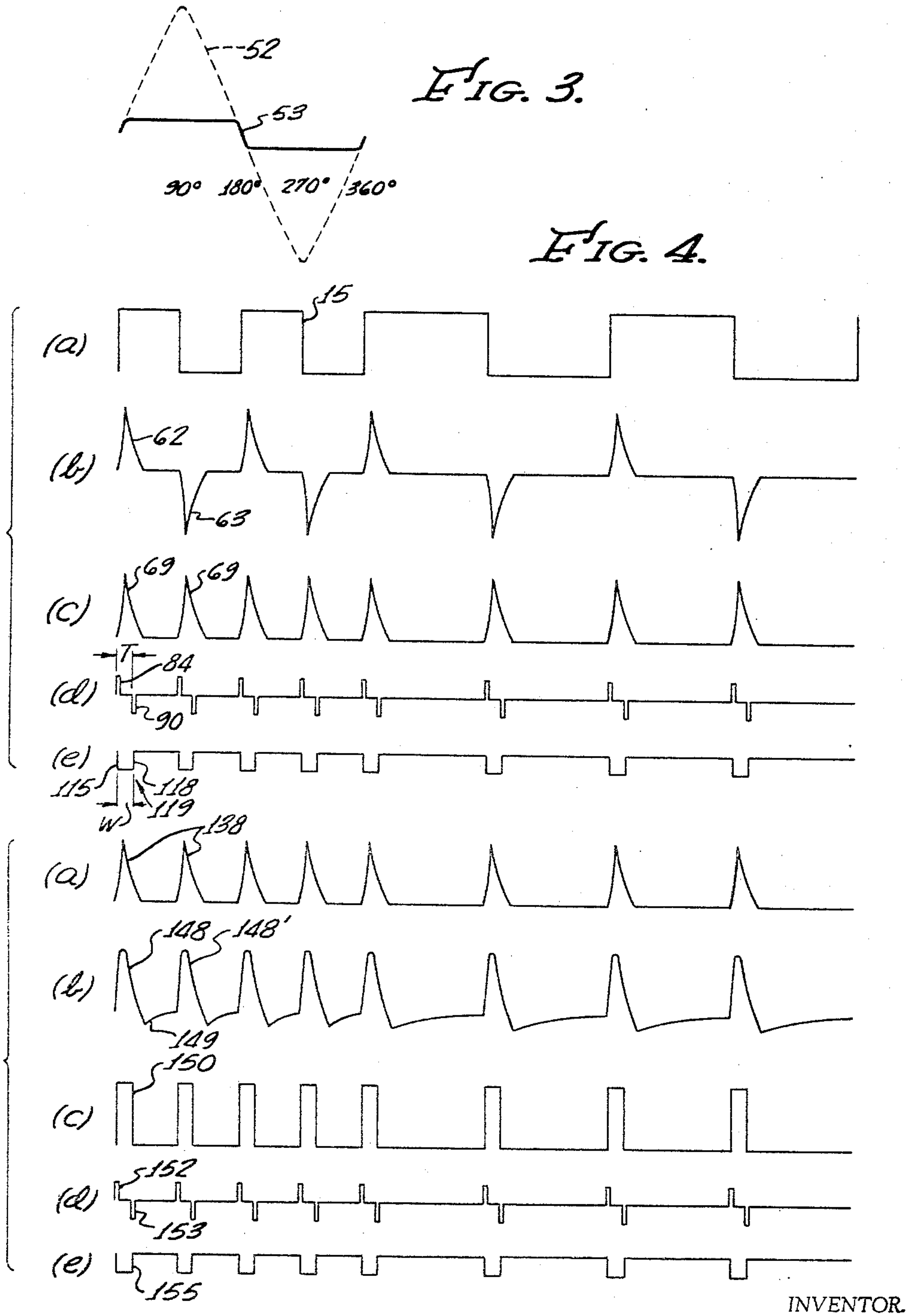
FIG. 3 is a waveform showing the operation of the limiting stage.
Figure 5:
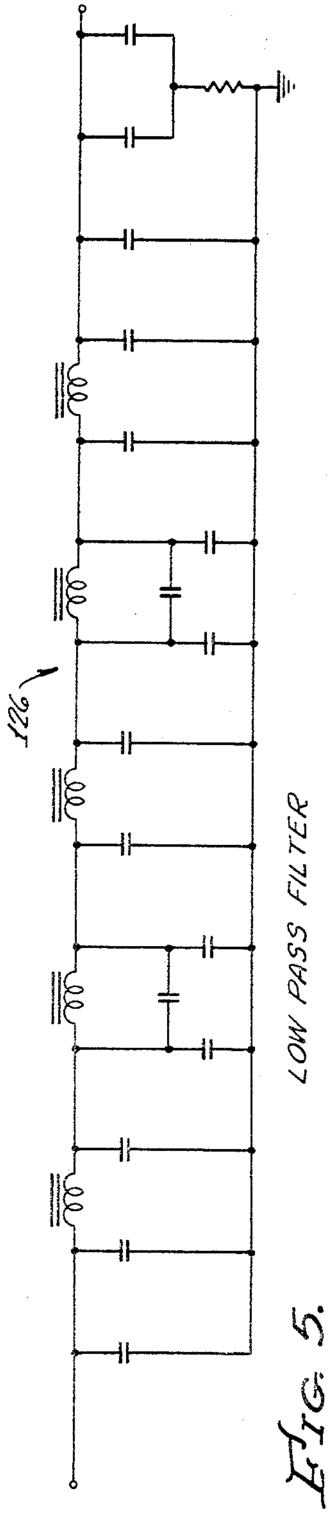
Figure 6:
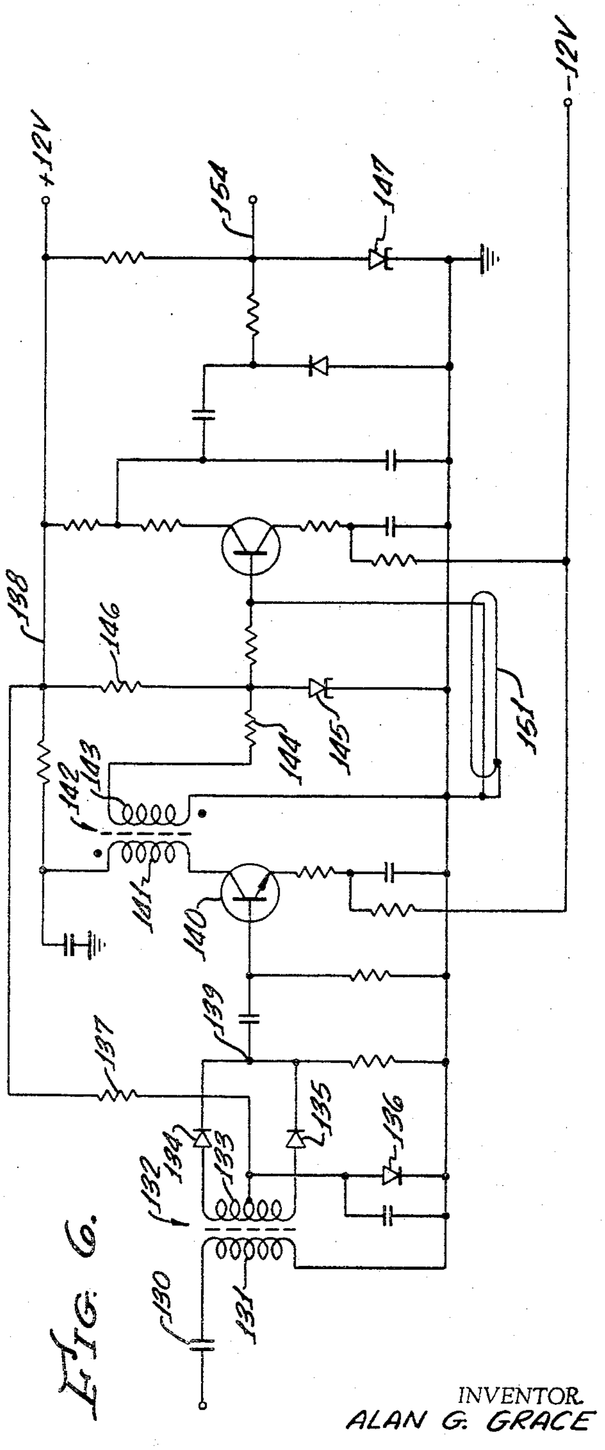

FIGS. 4*a* through 4*e* are waveforms at several points in the demodulator of FIG. 2 illustrating its mode of operation;

FIG. 5 is a schematic waveform of a low-pass filter stage designed for use with the embodiments of this invention shown in FIGS. 3 and 6;

FIG. 6 is a schematic of a preferred embodiment of the present invention; and

FIGS. 7*a* through 7*e* illustrate waveforms at several points in the schematic of FIG. 5.

Figure 1:
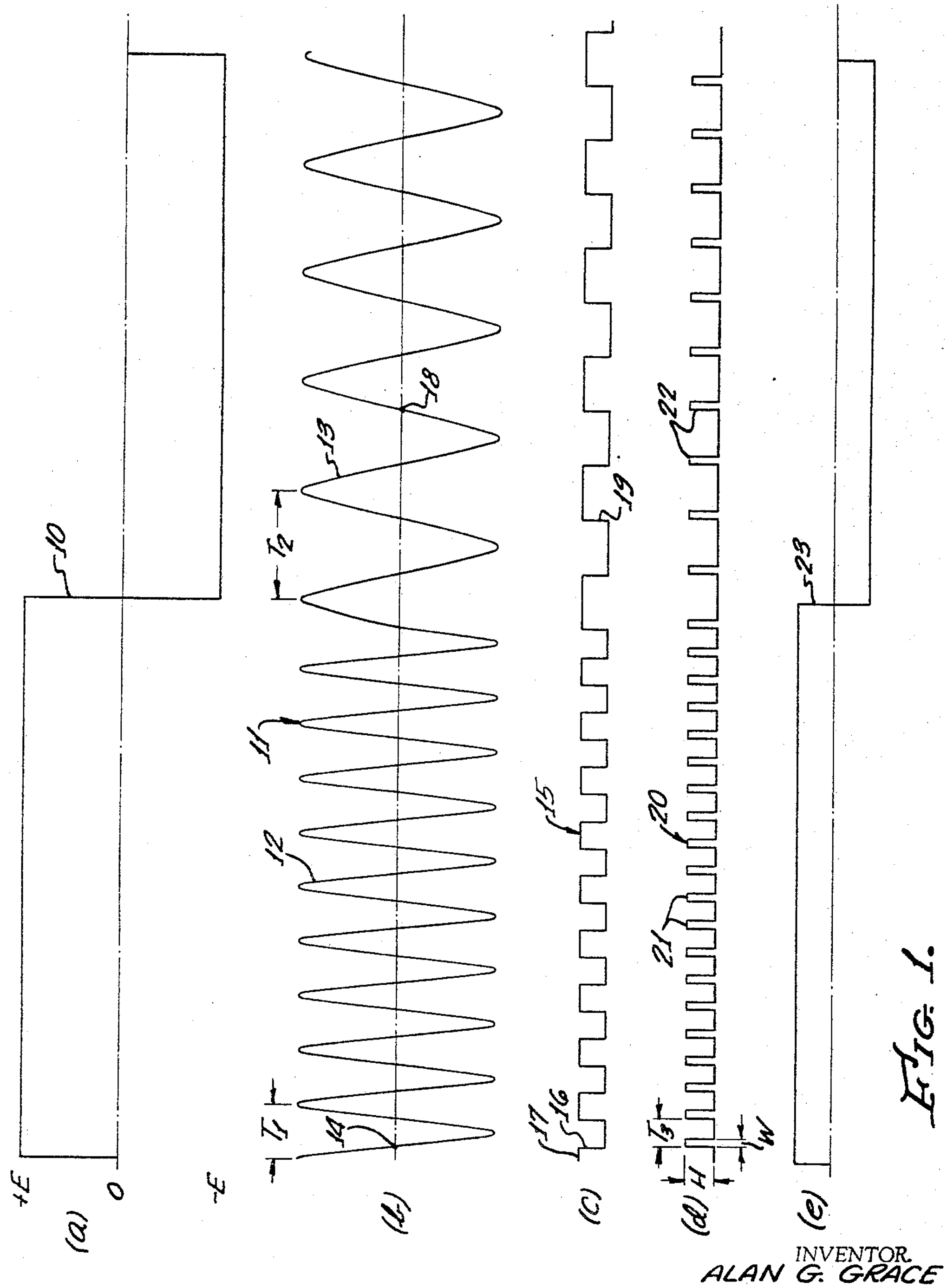

The general demodulation technique involved herein is illustrated in FIGS. 1*a* through 1*e*. For ease of illustration, a very simple modulating signal in the form of a square wave is shown in FIG. 1*a* at 10. The resultant frequency modulated signal is shown in FIG. 1*b* at 11, having a first sine wave 12 of period $T_1$ corresponding to the fixed amplitude at level +E of the modulating signal 10 and a second sine wave 13 of longer period $T_2$ corresponding to the fixed amplitude level −E of the modulating signal. In the demodulator system, a limiter stage provides a square wave input signal 15 shown in FIG. 1*c* corresponding to the instantaneous frequency of the F.M. signal. Thus, each negative going zero crossing of the signal 11, such as point 14, produces a negative going edge 16 of pulse 17 of pulse train 15. Likewise, the positive going zero crossing of the signal 11 at point 18 produces a positive going pulse edge 19. The function of the demodulation system is to produce a pulse of predetermined area for each transition of the square waveform of FIG. 1*c* through the zero axis. The resultant waveform 20 is shown in FIG. 1*d* wherein each of the pulses 21 correspond to each respective zero axis crossing of the sine wave 12 of the modulated signal and each of the pulses 22 correspond to respective zero axis crossings of sine wave 13 of the modulated signal. Thus, the period $T_3$ of the pulse train 21 is one-half period $T_1$ of the corresponding pulse train 12, i.e., the repetition frequency of the pulse train 20 is twice the instantaneous frequency of the demodulated waveform 11 of FIG. 1*b*. It will be seen that the waveform of FIG. 1*b*, when averaged through a low-pass filter, reproduces in waveform 23 the original modulation signal 10 of FIG. 1*a*.

An appreciation of the difficulties in achieving a linear and phase and frequency distortionless demodulator is that for an F.M. signal having an instantaneous frequency of 5 megacycles, the period $T_3$ of the pulse wave 20 is only 100 nanoseconds. For signals of this frequency, the width (W) must be less than 100 nanoseconds, preferable 20 to 30 nanoseconds. It will be seen that any variation in the area of the pulses 21, caused for example by a variation in the leading or trailing edge of the pulse or a variation in the pulse amplitude, will result in an error since the filtered output will also be modified by any pulse area variation. A significant feature of demodulation systems constructed in accordance with the present invention is that the width (W) is maintained at a predetermined value of less than 100 nanoseconds throughout the frequency spectrum of the frequency modulated video waveform. Further, each pulse of the wave 20 is of constant amplitude and in accurate phase correspondence with the zero crossover points of the modulated signal 11, thereby achieving a very accurate reproduction of the modulating signal waveform.

Referring now to FIG. 2, the frequency modulated signal, such as the simplified waveform 11 of FIG. 1*b*, is applied to the input terminal 25 of a limiter stage 26. It is the function of the limiter to determine the instantaneous frequency of the F.M. input signal while being insensitive to amplitude changes of this input signal. The limiter accomplishes this by providing the signal output 15 of FIG. 1*c*, i.e. a square wave representing precisely the zero cross-over points of the frequency modulated waveform. Some desirable operating characteristics of the limiter stage are that it have a good phase and frequency response over a wide frequency bandwidth so that none of the frequency information is lost; that it have a square wave output; that it have excellent linearity, handling both the positive and negative excursions the same; and that it have sufficient gain to substantially reduce the amplitude variations of the input waveform—a 50 db reduction in A.M. content, for example. These requirements are met by the limiter 26 which basically comprises four level-sensitive stages 27, 28, 29 and 30 followed by respective amplifier stages 31, 32, 33 and 34. Each of the level-sensitive circuits and amplifier stages have identical circuit schematics. These stages are also noteworthy in not requiring plural controls or adjustments.

Input terminal 25 is coupled to the level-sensitive stage 27 comprising parallel oppositely-poled diodes 35 and 36. Usually the signal at 25 is at a fairly low level; however, if a high peak or transient appears at the input, the diodes 35, 36 limit the input to the base of transistor 37 of stage 31 to a value (1.2 volts, for example) such that the amplifier stage 31 will not be overloaded.

Amplifier stage 31 comprises a first transistor 37 connected as a grounded emitter with degenerative feedback through resistor 38 and capacitor 39, thus providing a sufficiently high input impedance (400 ohms, for example) so that the diodes 35, 36 and the F.M. signal source connected to 25 are not materially loaded. Transistor 37 is cascade coupled to transistor 40 which amplifies all of the current output of transistor 37. The output of stage 31 is taken from the collector of transistor 40 loaded by resistor 41. This collector is also tied to positive bus 45 through inductance 46. Stage 31 and like stages 32, 33 and 34 provide the necessary gain and a wide bandwidth without phase or frequency distortion. Thus, the approximate gain of stage 31 is the ratio of resistor 41 to resistor 38, representative values being 470 ohms and 22 ohms giving an approximate gain of 20. Resistively loaded inductance 46 insures that the transistor, wiring and other capacitances are completely damped, insuring good video response.

The amplified output from stage 31 is more than sufficient to drive the diodes 50, 51 of level-sensitive stage 28 into their saturation region for respective positive and negative swings of the output signal. These diodes limit both the positive and negative excursions of the output of stage 31 in the same manner, resulting in a small portion being taken out of the input wave. This operation is illustrated in FIG. 3, where the output waveform 52 from stage 31 is limited so that a small portion 53 is taken out which represents only a few degrees of the output near its zero crossover points. Signal 53 is then amplified in stage 32 and its amplified output limited in stage 29, this procedure being repeated in the succeeding amplifier and level-sensitive stages for approaching closer and closer to the zero crossings of the input F.M. waveform and in this way, eliminating any inaccuracies caused by amplitude variations in the F.M. modulated input. As a result, the signal on the output lead 55 of the amplifier stage 34 is a square wave (as represented by the waveform 15 of FIG. 1*c*, a portion of which is shown in expanded form in FIG. 4*a*) closely representing the instantaneous frequency of the waveform applied to input terminal 25. This output lead is connected to the input of the demodulator stage.

One embodiment of the demodulator is shown in FIG. 2, wherein the output lead 55 of the limiter is connected to a tightly coupled high frequency transformer 60 through capacitor 61. Capacitor 61 and transformer 60 provide a differentiation of the output signal of the limiter, resulting in a positive pulse 62 and negative pulse 63 for the leading and trailing edges of each square wave at the output of the limiter, as shown in FIG. 4*b*. Transformer 60 provides a means for producing a pulse train at twice the instantaneous carrier rate so as to greatly simplify filtering of the carrier energy. Thus, transformer 60 includes a primary winding 65 connected through differentiating capacitor 61 to the output of limiter stage 26 and a secondary winding 66 having its opposite ends connected to the anodes of the diodes 67, 68 respectively and a grounded center tap. The positive going differentiated pulse on the secondary 66 is conducted through diode 67 and the negative going differentiated pulse is conducted through diode 68, the cathodes of these diodes being connected together to provide a series of positive pulses 69 (FIG. 4*c*) at the base of transistor 70. Accordingly, a positive pulse 69 is produced for every zero axis crossover at the output of the limiter, thus producing a pulse train at twice the instantaneous carrier rate.

One of the difficulties in providing linear demodulation is that the pulses 69 will very somewhat in area over the deviation range due to slight changes in height and in rise and fall times (typically of the order of 15–20 nanoseconds), so that these differentiated pulses are not suitable in themselves for providing linear demodulation over a wide frequency range. A significant feature of the demodulation systems constructed in the manner herein described is that means are provided respsonive to the variable pulses 69 for generating pulses of predetermined area over a very wide frequency range and in time correspondence to each of the pulses 69. Thus, the pulses 69 are reproduced at the output of transistor 70 connected as an emitter follower stage through load impedance 75 and a small inductance 76 to the anode of a tunnel diode 77. Each of the positive input pulses 69 at the base of transistor 70 causes a positive current pulse to be fed through resistance 75, and inductance 76 to the tunnel diode 77 whose cathode is then effectively grounded by capacitor 80. Tunnel diode 77, while normally biased OFF, is supplied with a small bias current through resistance 78 connecting its cathode to the negative bus 79 so that the tunnel diode 77 requires only a very small current input to fire (less than 50 milliamperes, typically, while still being biased well below its peak current value). This extremely low trigger level insures that only a small initial portion of the output pulse waveform from the emitter follower is required to fire the tunnel diode 77.

Firing of this element is thus initiated very soon after the initiation of a pulse 69 regardless of the rise time of the entire pulse. Moreover, the firing of the tunnel diode is accomplished in an extremely short time interval, e.g., one to two nanoseconds, and is substantially entirely a function of the internal dynamics of the element. The characteristics of the tunnel diode are such as to provide a positive voltage transition of fixed value (typically ½ volt) across the tunnel diode in this very short time interval. Sufficient energy is supplied from the emitter follower to provide, when the tunnel diode 77 triggers, a very fast positive pulse 84 (FIG. 4*d*) through capacitor 85 and line impedance matching resistor 86 into a shorted delay line 87.

The tunnel diode 77 is turned OFF upon termination of the firing pulse at the emitter of transistor 70 by the combination of the inductance 76 and capacitor 88 connected between ground and the common junction of the load resistance 75 and inductance 76. Capacitor 88 and inductance 76 provide a semituned circuit so that the energy stored in the inductance at the abrupt termination of the pulse output of transistor 70 causes a negative going overshoot, which immediately returns the tunnel diode to its OFF state. Since the tunnel diode is normally biased OFF, it will remain in this state until a succeeding pulse 69.

A fixed time interval is required for pulse 84 to travel the length of the delay line 87 and be reflected back as the negative going pulse 90 shown in FIG. 4*d*. The time interval T between the incident wave 84 and reflected wave 90 is determined by the length of the delay line. The length of the pulse line 87 is selected so as to provide a period T shorter than the longest period that will be used in the demodulation. A typical time delay is 12.5 nanoseconds, giving a period T of 25 nanoseconds.

The incident and reflected pulses applied to the delay line 87 are also applied to a current amplifier stage comprising transistor 95 whose base is connected to the input of the delay line 87. The collector electrode of this transistor is normally clamped to a small negative potential by bias resistors 96 and 97 connecting the collector to positive bus 98 and resistors 99 and 100 connecting the emitter to negative bus 79. The collector is also coupled to the anode of a second tunnel diode 105 through capacitor 106 and resistor 107. The common junction between the capacitor and resistor is connected to the cathode of diode 108 whose anode is grounded. Tunnel diode 105 is ordinarily biased ON by resistor 109 connecting its anode to the positive bus 98.

The operation of transistor 95, tunnel diode 105 and diode 108 are as follows. The positive incident pulse 84 applied to the base of transistor 95 causes a negative step at the collector electrode of this transistor. This negative step is clamped by diode 108 resulting in a very fast turn OFF of tunnel diode 105—the voltage between its anode and cathode dropping from approximately one-half volt to a few millivolts in less than 2 nanoseconds. Accordingly, a negative going transitional wave front is produced across the tunnel diode (as shown at 115 in FIG. 4*e*), this wave front being applied to the input of filter stage 116. Node 117 is reduced to a potential of a few millivolts, as determined by the characteristics of the tunnel diode 105, and remains at this level until the reflected pulse 90 is applied to the base of transistor 95. This negative input at the base provides a positive step at the collector of transistor 105 which turns ON the tunnel diode 105, resulting in a positive going transition 118 as shown in FIG. 4*e*. It will thus be seen that a pulse 119 has been produced having a width W corresponding to the period T of the delay line, extremely short rise and fall times of the order of 2 nanoseconds substantially entirely independent of the differentiated pulses 69 (FIG. 4*c*), and an amplitude which is fixed by the characteristics of the tunnel diode 105. Accordingly, the area of pulse 119 is extremely steady over a very wide frequency range. It will particularly be noted that the shape and area of the pulse 119 is determined by the characteristics of the tunnel diodes and the delay line without need for adjustment or controls of the circuit elements.

The pulse train shown in FIG. 4*e* across the tunnel diode 105 is averaged through a low-pass, linear phase filter comprising a first filter stage 116, an amplifier stage 125 and a second low-pass, linear phase filter stage 126. A complete circuit schematic of the latter stage 126 is shown in FIG. 5. Typically, the response characteristic of filter 116 include a flat pass band out to 7 megacycles and falling off 3 db at 9 megacycles. Filter 116 reduces the rise times of the pulses 119 produced by tunnel diode 105 such that the information can be handled properly in the transistor amplifier 125; i.e., the rise time delays in transistor 125 will not introduce errors in the demodulator output. The collector of transistor 125 is connected to the input of the second low-pass filter stage 126 which accomplishes the remainder of the filtering operation. A typical response characteristic for the liner phase filter 126 shown in FIG. 5 is a flat pass band out to 4 megacycles, dropping down 3 db at 4.25 megacycles and dropping to greater than 45 db at all frequencies above 5.6 megacycles, thus insuring that the entire video bandwidth is recovered while effectively removing the carrier energy.

A preferred embodiment of the demodulator constructed in accordance with this invention is shown in FIG. 6. As in the preceding embodiment, the output of the limiter is introduced through a differentiating capacitor 130 to the primary winding 131 of a tightly coupled high frequency transformer 132. The opposite ends of the transformer secondary winding 133 are connected to the anodes of respective diodes 134 and 135. These diodes are biased to their threshold potential by diode 136 connected between the center tap of the secondary winding 133 and ground. Diode 136 is biased ON by resistor 137 connected to the positive potential bus 138. In this way, all of the signal appearing on the secondary winding can be conducted through the respective diodes 134 and 135 without a portion of same being required to initially forwardly bias the diodes.

The differentiated pulses 138 appearing at node 139, the common junction of the diodes 134 and 135, are illustrated in FIG. 7*a* and are, of course, akin to those shown in FIG. 4*c*. These pulses are introduced into the base of transistor 140 included in an amplification stage having a gain of the order of 10. The collector of transistor 140 is connected through the primary winding 141 of closely coupled high frequency transformer 142 to a positive source of bias. Transformer 142 comprises a current step-up transformer having an oppositely wound secondary winding 143 connected between ground and the load comprising resistance 144 and tunnel diode 145.

Tunnel diode 145 is biased by resistor 146 and positive bus 138 so that in excess of its peak current will normally be supplied to it, thereby biasing this tunnel diode into its ON state. However, as will be explained below, the operation of the circuit is such that the tunnel diode is normally maintained OFF by the action of the transformer 142.

Changes in state of the tunnel diode 145 produce transitional wave fronts at the input of shorted delay line 151 to produce an incident and reflected pulse for turning the second tunnel diode 147 OFF for a predetermined time interval in the manner of the circuit of FIG. 2, as described hereinabove.

The operation of the amplification stage 140, transformer 142 and tunnel diode 145 is as follows: The differentiated positive pulses 138 applied to the base of transistor 140 produce a negative wave in the primary winding which is inverted and appears as a positive wave 148 at the output of the secondary winding 143 (see FIG. 7*b*). This positive waveform 148 drives the tunnel diode 145 ON. After the termination of the differentiated pulse 138, the collector of transistor 140 goes positive, resulting in a negative wave 149 in the secondary 143, as shown in FIG. 7*b*, which turns the tunnel diode OFF. The L/R time constant of the transformer and load resistance 144 is larger than the longest preiod between the pulses 138, i.e., larger than the period of twice the highest instantaneous frequency of the input F.M. signal, so that the negative wave 149 maintains the tunnel diode OFF until the succeeding pulse 148′ is applied at the base of transistor 140.

The ON time of tunnel diode 145 is fairly long, i.e., of the order of 25 nanoseconds, due to the transformer action of transformer 142. Although the width of the resultant pulses 150 produced across the tunnel diode is quite broad, the rise time of these pulses is very short due to the fast trigger of the tunnel diode. The delay line 151 responds only to the wave front presented by the leading edge of the pulses 150 so that the operation of the delay line and the succeeding portion of the circuitry of FIG. 6 is as described hereinabove in connection with the circuitry of FIG. 2. Thus, an incident pulse 152 and reflected pulse 153 (FIG. 7*d*) are applied to the delay line 151, producing on lead 154 the desired pulse waveform shown in FIG. 7*e*, comprising a series of pulses 155 of predetermined area at twice the instantaneous frequency of the modulated input signal. This pulsed waveform is then applied to a low-pass filter means, as shown in FIGS. 2 and 5, for recovering the original modulating signal.

A significant feature of the embodiment of FIG. 6 is that the amplification provided by transistor stage 140 effectively reduces to an even lower level the threshold response level of the first tunnel diode 145, which is fired by only a very small portion of the differentiated pulse 138. This, of course, further improves the linearity of the system operation by making it even more independent of the rise times of the differentiated pulses which vary somewhat over the deviation frequency range due to the finite gain of the limiter stage.

I claim:

1. A demodulator system for reproducing a frequency modulated, magnetically recorded video signal comprising:

limiter means for producing a square wave representing the instantaneous frequency of said frequency modulated waveform;

means responsive to the square wave output of said limiter means for producing a differentiated pulse train at twice the instantaneous frequency rate of said frequency modulated waveform;

a first tunnel diode;

means responsive to said differentiated pulse train for triggering said first tunnel diode from a first state to a second state thereof for producing a transitional wave front;

a delay line responsively coupled to said transitional wave front for producing a reflected wave a predetermined time period after said incident wave;

a second tunnel diode;

means coupling the incident and reflected waves from said delay line to said second tunnel diode so that said tunnel diode is triggered to one of its states by said incident wave and to the opposite state thereof by said reflected wave to produce a train of pulses occurring at twice the instantaneous frequency rate of said frequency modulated waveform, each of said pulses having a predetermined area substantially solely determined by the characteristic of said first and second tunnel diodes and said delay line and independent of the frequency and amplitude of said frequency modulated signal; and, a low-pass filter coupled to said second tunnel diode and having a linear phase and flat attenuation characteristic over the video band and attenuating the frequencies above said video band so as to remove the carrier energy from the demodulated output.

2. A demodulator system for reproducing a frequency modulated, magnetically recorded video signal comprising:

limiter means for producing a signal representing the instantaneous frequency of said frequency modulated waveform;

means responsive to the signal output of said limiter means for producing a differentiated pulse train at twice the instantaneous frequency rate of said frequency modulated waveform;

a first tunnel diode;

means responsive to said differentiated pulse train for triggering said first tunnel diode from a first state to a second state thereof for producing a transitional wave front;

a delay line responsively coupled to said transitional wave front for producing a reflected wave a predetermined time period after said incident wave;

means including a second tunnel diode responsive to the incident and reflected waves from said delay line for producing a train of pulses occurring at twice the instantaneous frequency rate of said frequency modulated waveform and having a predetermined area independent of the frequency band of said frequency modulated waveform; and a low-pass filter coupled to said second tunnel diode and having a linear phase and flat attenuation characteristic over the video band and attenuating the frequencies above said video band so as to remove the carrier energy from the demodulated output.

3. The demodulator system of claim 2 comprising:

means for returning said first tunnel diode to said first state, said means being responsive to the same differentiated pulse that originally triggered said first tunnel diode from its first state to its second state.

4. The demodulator system of claim 3 wherein said means for returning said first tunnel diode to said first state includes:

an inductance and capacitance coupled to said first tunnel diode so that energy stored in said inductance upon termination of said differentiated pulse provides an opposite polarity current for triggering said tunnel diode to its first state.

5. The demodulator system of claim 3 wherein said means for returning said first tunnel diode to said first state includes:

a pulse transformer, and means responsive to said differentiated pulse for driving said pulse transformer and providing a signal of one polarity for triggering said first tunnel diode to its second state followed by a signal of opposite polarity for returning said tunnel diode to its first state.

6. The demodulator system of claim 2 comprising:

means coupled to said first tunnel diode for amplifying said differentiated pulses to effectively lower the threshold response level of said first tunnel diode by enabling the tunnel diode to be triggered by a very small portion of said differentiated pulse train.

7. The demodulator system of claim 2 wherein said means for producing said differentiated pulse train includes:

a capacitor, a pulse transformer having its primary coupled to said capacitor, and a center tapped secondary, first and second semiconductive diodes coupled to opposite ends of said secondary, and means coupled to said center tap for biasing said diodes to their threshold potential so that a portion of the signal produced on the secondary is not required to initially forward bias said diodes.

References Cited

UNITED STATES PATENTS

| | | | |
|---|---|---|---|
| 3,231,824 | 1/1966 | Drapkin | 329—126 X |
| 3,260,860 | 7/1966 | Kozikowski | 328—58 X |
| 3,193,771 | 6/1965 | Boatwright | 329—134 |

ALFRED L. BRODY, *Primary Examiner.*

U.S. Cl. X.R.

329—205; 325—325; 328—54, 49; 307—220, 322